(12) United States Patent
Dunn et al.

(10) Patent No.: US 9,568,902 B2
(45) Date of Patent: Feb. 14, 2017

(54) HOME SECURITY SYSTEM WITH TOUCH-SENSITIVE CONTROL PANEL

(71) Applicant: Vivint, Inc., Provo, UT (US)

(72) Inventors: Alex J. Dunn, Orem, UT (US); Todd Matthew Santiago, Orem, UT (US); Bruce Ehlers, Lehi, UT (US); James E. Nye, Alpine, UT (US); Christopher Lee Harris, Holladay, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/211,018

(22) Filed: Mar. 14, 2014

(65) Prior Publication Data

US 2014/0267112 A1     Sep. 18, 2014

Related U.S. Application Data

(60) Provisional application No. 61/791,142, filed on Mar. 15, 2013.

(51) Int. Cl.
*G05B 15/02* (2006.01)
*G06F 3/01* (2006.01)
(Continued)

(52) U.S. Cl.
CPC ............ *G05B 15/02* (2013.01); *G06F 3/016* (2013.01); *G06F 3/0416* (2013.01); *G08B 13/19682* (2013.01); *G08B 13/19689* (2013.01); *G05B 2219/23377* (2013.01); *G05B 2219/2642* (2013.01); *G06F 3/0484* (2013.01);
(Continued)

(58) Field of Classification Search
CPC ...... G06F 3/016; G06F 3/0412; G06F 3/0416;
G06F 3/0484; G06F 3/04845; G06F 3/0488; G06F 2203/014; G06F 2203/04104; G06F 2203/04808; G08B 13/19678; G08B 13/19682; G08B 13/19684; G08B 13/19689; G08B 13/19691; H04L 12/2803; H04L 12/2816; H04L 12/282; G05B 15/02; G05B 2219/23377; G05B 2219/2642
See application file for complete search history.

(56) References Cited

U.S. PATENT DOCUMENTS 5,086,385 A  * 2/1992  Launey ............... G06F 3/04847
                                              340/6.11
8,489,065 B2    7/2013  Green et al.
(Continued)

FOREIGN PATENT DOCUMENTS

AU        2013100081       3/2013

*Primary Examiner* — Keith Crawley
(74) *Attorney, Agent, or Firm* — Holland & Hart LLP

(57) ABSTRACT

A security system includes a control panel and sensors for monitoring conditions related to the security of a residential or commercial location. The control panel communicates with the sensors and displays information related to the operation of the security system. The control panel may also receive user input. User input can be received at a touch-sensitive display on the control panel. The touch-sensitive display may be adapted to receive and recognize multiple, simultaneous touches. Different types of touches can be associated with different actions taken by the touch-sensitive display. Detection of types of touches can also include gesture identification. A haptic response may also be provided for giving tactile feedback when input is received at the control panel.

21 Claims, 11 Drawing Sheets

(51) Int. Cl.
*G08B 13/196* (2006.01)
*G06F 3/041* (2006.01)
*G06F 3/0484* (2013.01)
*G06F 3/0488* (2013.01)

(52) U.S. Cl.
CPC ........ *G06F 3/0488* (2013.01); *G06F 3/04845* (2013.01); *G06F 2203/014* (2013.01)

(56) References Cited

U.S. PATENT DOCUMENTS

| | | |
|---|---|---|
| 2003/0038849 A1 | 2/2003 | Craven et al. |
| 2004/0260407 A1* | 12/2004 | Wimsatt ........................ 700/19 |
| 2006/0028428 A1* | 2/2006 | Dai et al. ..................... 345/156 |
| 2008/0088587 A1 | 4/2008 | Pryor |
| 2010/0156818 A1* | 6/2010 | Burrough et al. ............ 345/173 |
| 2011/0055773 A1* | 3/2011 | Agarawala et al. .......... 715/863 |
| 2011/0113360 A1* | 5/2011 | Johnson et al. .............. 715/771 |
| 2011/0314515 A1* | 12/2011 | Hernoud et al. ................. 726/2 |
| 2012/0068832 A1* | 3/2012 | Feldstein et al. ............ 340/12.5 |
| 2012/0282886 A1* | 11/2012 | Amis ........................ 455/404.2 |
| 2012/0282974 A1* | 11/2012 | Green et al. ............... 455/550.1 |
| 2013/0113993 A1 | 5/2013 | Dagit, III |
| 2013/0293718 A1* | 11/2013 | M et al. ........................ 348/152 |
| 2016/0262235 A1* | 9/2016 | Clymer ............. H05B 33/0845 |

* cited by examiner

HOME SECURITY SYSTEM WITH TOUCH-SENSITIVE CONTROL PANEL

CROSS-REFERENCE TO RELATED APPLICATIONS

The present Application claims priority to U.S. Provisional Patent Application No. 61/791,142, titled "Home Security System with Touch-Screen Interface," filed on Mar. 15, 2013.

TECHNICAL FIELD

The present disclosure relates to electronically controlled systems. More particularly, embodiments of the present disclosure relate to control panels and interfaces for use with electronically controlled systems, including automation systems in a home or commercial setting. More particularly still, embodiments of the present disclosure relate to touch-screen interfaces and control panels that are intuitive to use and operate.

BACKGROUND

At an increasing rate, people are purchasing electronic devices and appliances that can be used in connection with certain functions of residential or commercial buildings. Many of these devices are used separately for one purpose or another. For instance, home security systems, lighting control systems, security cameras, sprinkler systems, telephone systems, entertainment (e.g., audio, video, television, etc.) systems, heating and air conditioning (HVAC) systems, and the like may each be controlled electronically using various controllers.

In some cases, operation of multiple devices and systems may be collectively managed using automated control systems. Examples may include universal remote controls for operating multiple types of entertainment systems, as well as home security and thermostat systems that can control HVAC and security of a residential or commercial building.

Whether controls for electronic devices are for individual devices or for centralized control of multiple devices, user interfaces may be provided to enable a user to interact with the electronic device(s). A remote control may, for instance, allow a user to power on or off multiple electronic entertainment devices, or to change volume, input sources, audio/video quality, and the like. In the context of a security and thermostat system, the interface may allow a user to arm or disarm a security device or change a home heating/cooling scheme or temperature, among other features.

Such interfaces typically operate using a combination of mechanical and electrical components. For instance, the user interface may include a control panel having a set of buttons (e.g., numerical, alphabetic, task-specific, etc.). The buttons, when depressed, can cause an actuator to generate an electronic signal. That signal may be transferred through circuitry in the control panel and/or to a device being monitored or controlled. An air conditioning unit or furnace may, for instance, be turned on or off in response to a user pressing a button. Similarly, an alarm on a door or window may be armed or disarmed depending on the button that is depressed.

Buttons on a control panel, while useful for certain functions, may limit the overall operation or intuitive operation of the control panel itself. In particular, each button generally has one or two primary functions, and added functions may require advanced operations that can require the user to consult a menu or operation manual, which operations are non-intuitive. Such limited functions for the control buttons may make the control panel difficult to use. In addition, a button-based interface may make a control panel impractical for centralized use in controlling many different systems and components. This may be the case because the control panel may either require a large number of buttons, or because limited buttons may have multiple different associated operations, making it difficult for the user to learn how to use the control interface.

SUMMARY

In accordance with aspects of the present disclosure, embodiments of methods, systems, software, computer-program products, and the like are described or would be understood and which relate to use of a security system for a residential or commercial location. The security system includes a control panel monitoring operation and/or status of the sensor for detecting a security condition at the residential or commercial location. Input related to the security system may be input at the control panel, which control panel may include a touch-sensitive display. The touch-sensitive display may receive and detect multiple simultaneous touches and perform actions based on the multiple touches received.

In accordance with some embodiments, the control panel may be equipped to differentiate between types of touches. The control panel may identify respective locations of each of multiple touches. Gestures associated with one or more of the multiple touches may additionally or alternatively be identified. The number of multiple touches may also be determined. Types of touches detected may include a tap, double tap, drag, flick, rotate, spread, or pinch, among other things.

Based on the types and/or numbers of simultaneous touches, the control panel may perform any of a number of different actions. Actions may include pan, zoom, scroll, rotate, and other actions. In some embodiments, the control panel may include a haptic response component. The haptic response component may provide a tactile response to input received at the control panel. A tactile response may be provided based on input received at the touch-sensitive display or at components separate from the display. Some components separate from the display may include a home and/or emergency input.

Multiple components and systems may be monitored by a control panel within a security system. The security system may include intrusion, fire, flood, or carbon monoxide sensors. The security system may also include a camera. If a camera is provided, still or video images may be provided and displayed on the control panel. A map or camera image on the display may be manipulated using the touch-screen capable of recognizing multiple simultaneous touches. Input may be used to rotate, pan, scroll, zoom-in or zoom-out on such images.

In accordance with other embodiments of the present disclosure, a security system is described. The security system may include a security component, such as a sensor, for detecting a potential security threat. A control panel may have a communication link with the security component and monitors a status thereof. A display may be included in the control panel and can display information related to the status of the security component. The display may be touch-sensitive to receive and recognize input with multiple, simultaneous touches. The display may differentiate between touches, including gestures associated therewith.

The security system may include a haptic response component to provide tactile feedback when input is received at the control panel.

Embodiments disclosed herein relate to methods for providing security at a residential or commercial location. Security may be provided using a control panel dedicated for use at a particular location. The control panel may monitor a security system including at least one sensor. Information relating to the operation or status of the sensor may be displayed on the control panel. Input may also be received at the control panel, which input may include multi-touch input on a touch-sensitive display. The touch-sensitive display may be a capacitive touch-screen.

When providing security, a number of different types of sensors may be used. Sensors may detect intrusion, and can include cameras. A camera may provide still or video images that can be displayed on the display of the control panel. A map or other image may also be provided from a camera or other device and displayed on the control panel. Using multi-touch and/or gesture recognition, the control panel may select, open, close, delete, zoom, pan, scroll, change, rotate, or otherwise manipulate an image or object on the display.

Further embodiments may relate to security systems further included as part of a home or other automation systems. A control panel of an automation system including security features or systems may also, for instance, monitor entertainment systems within a residential or commercial location. Additional or alternative systems monitored or controlled using the control panel may include HVAC systems (e.g., thermostat, heating, air conditioning, etc.), lighting systems, sprinkler systems, and telephone systems.

Other aspects, as well as the features and advantages of various aspects, of the present disclosure will become apparent to those of ordinary skill in the art through consideration of the ensuing description, the accompanying drawings and the appended claims.

BRIEF DESCRIPTION OF THE DRAWINGS

In order to describe the manner in which features and other aspects of the present disclosure can be obtained, a more particular description of certain subject matter will be rendered by reference to example embodiments illustrated in the appended drawings. These drawings depict only example embodiments and therefore are not considered to be limiting in scope, nor drawn to scale for all embodiments. Various embodiments will be described and explained with additional specificity and detail through the use of the accompanying drawings in which.

DETAILED DESCRIPTION

Systems, devices and methods according to the present disclosure are configured for use in connection with residential and/or commercial security systems. Without limiting the scope of the present disclosure, a home or business may use a security system for added safety of residents or patrons, or to protect valuable property. Optionally, the security system may also include capabilities for operating in connection with other systems. For example, systems under centralized control with the security system may include lighting components, sprinkler systems, HVAC components, audio/video systems, and the like.

Figure 1:
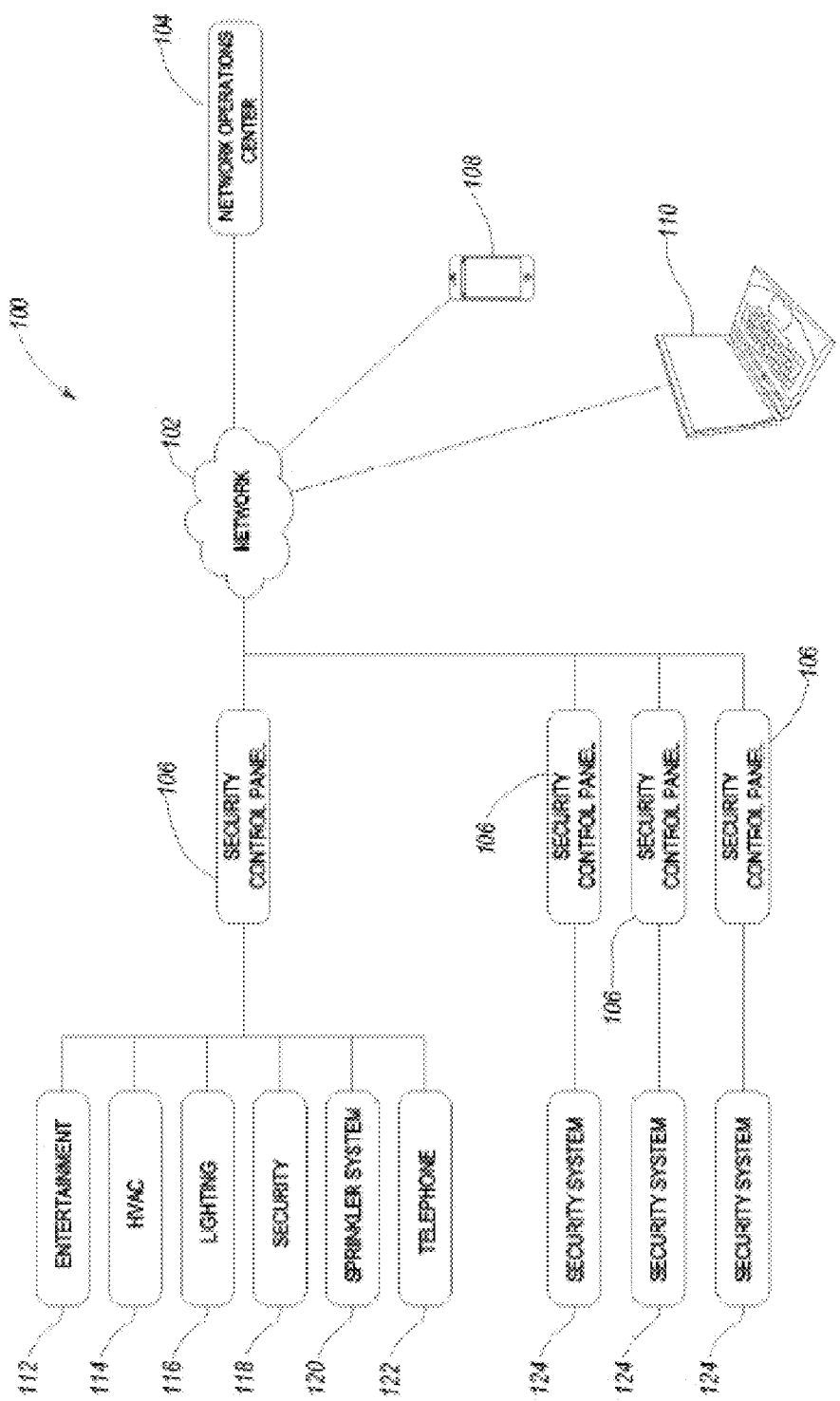
FIG. 1 is a schematic diagram of an example security system, according to one example embodiment of the present disclosure.

Turning now to FIG. 1, an embodiment of an exemplary security system is shown, including a distributed system 100 for managing and monitoring security-related issues of a residence or business. The operation of the system 100 may include a network 102 facilitating communication between a network operations center 104 and one or more control panels 106.

The network 102 may be capable of carrying electronic communications. The Internet, local area networks, wide area networks, virtual private networks (VPN), other communication networks or channels, or any combination of the forgoing may be represented by the network 102. Thus, it should be understood that the network 102 may operate in any number of different manners, and may include different components which may be distributed at different locations. For instance, the network 102 may include a wireless communication system provided by a mobile phone provider, although wired communication may also be used. Moreover, while a single network 102 is illustrated, such a component may be illustrative of multiple devices or components. For instance, the network 102 may include multiple networks interconnected to facilitate communication.

The network operations center 104 may monitor the operation of the control panel 106, which may be associated with a security system. For instance, the network operations center 104 may monitor the control panel 106 to ensure they are operating and communicating properly, to update software or firmware on the control panel 106, and the like. In addition, the network operations center 104 may monitor signals received by the control panel 106. For instance, if a control panel 106 receives a signal indicative of a breach at an armed door or window of a building, the network operations center 104 may be notified of such event over the network 102. The network operations center 104 may then perform some security-related function (e.g., notify the police, make a telephone call to the owner of the building, etc.). Of course, the network operations center 104 may provide any number of other functions, and may be distributed among multiple devices, components or facilities.

In at least one embodiment, the control panel 106 may be located at, or otherwise associated with, a particular location such as a home or business. At the respective locations, users may manually operate the control panel 106 to provide security-related functions. In the same or other embodiments, electronic devices 108, 110 remote from the control panel 106 may send signals over the network 102 to control operation of the control panel 106 so that manual operation at the control panel 106 is not required.

The control panel 106 may monitor the operations of a number of different systems, components or appliances. As shown in FIG. 1, example components monitored by the control panel 106 may include an entertainment system 112, a HVAC system 114, a lighting system 116, a security system 118, a sprinkler system 120 and/or a telephone system 122. Other components, appliances, systems, and the like may also be provided as indicated by the illustrated ellipses. Furthermore, the types of security and/or automation systems 124 monitored by additional control panels may include the same or other components.

The system 100 of the present disclosure is implemented as a communication system in which the operations of electronic components may be monitored through communication links. The communication links may be wired or wireless, or may include a combination of wired and wireless links. Regardless of the particular mode of communication, the status or operation of devices and components within the system 100 may be reported or otherwise communicated to a corresponding control panel 106, network operations center 104, or one of the electronic devices 108, 110. The monitored systems 112-124 may therefore include any number of different types of components that provide or receive electronic signals.

For example, the entertainment system 112 may include components such as televisions, recordable media players (e.g., DVD player, Blu-Ray Player, digital video recorders, VCR, etc.), projectors, speakers, stereos, and the like. The HVAC system 114 may include thermostats, air conditioners, furnaces, temperature sensors, etc. The lighting system 116 may include light fixtures, switches, sensors (e.g., motion sensors), or additional components. The security system 118 may include sensors and/or detectors (e.g., motion sensors, magnetic sensors, intrusion sensors, vibration sensors, infrared sensors, ultrasonic detectors, microwave detectors, contact sensors, photoelectric beam detectors, smoke detectors, temperature sensors, carbon monoxide detectors, etc.), video or still cameras, speakers, microphones, or other components. The sprinkler system 120 may include valves, actuators, sensors (e.g., flow rate sensors, proximity sensors, etc.), sprinklers, pumps, and the like. The telephone system 122 may include telephones, answering machines, call forwarding components, and the like.

The system 100 is illustrative of an example system that may provide distributed functionality. As discussed above, for instance, electronic devices 108, 110 may communicate with the control panel 106 and/or the network communications center 104. For instance, a control panel 106 may be at a home. The home owner may be away from home and may use electronic devices 108, 110 to communicate over the network 102 with the control panel 106. The user may provide input to the electronic devices 108, 110 to control the signals the control panel 106 sends to components of the security system 118, HVAC system 114, lighting system 116, or the like. Alternatively, the control panel 106 may provide information to the electronic devices 108, 110. For example, a camera of the security system 118 may provide video or still images that can be communicated over the network 102 to allow the user of the electronic devices 108, 110 to see what is happening at the home. Similar information may be provided to the network operations center 104, or the network operations center 104 may provide control signals to the control panel 106.

The system 100 of FIG. 1 is but one example of a suitable system for embodiments of the present disclosure. In the illustrated embodiment, functions may occur at one or more locations (e.g., sensor monitoring at the control panel 106, alarm/alert handling at the network communication center 104, etc.). In other embodiments, data may be processed or interpreted in other manners. Further, components within the system 100 may communicate continuously, by using pushed communications, by using pull communications, or using some other communication system or any combination of the foregoing.

Figure 2:
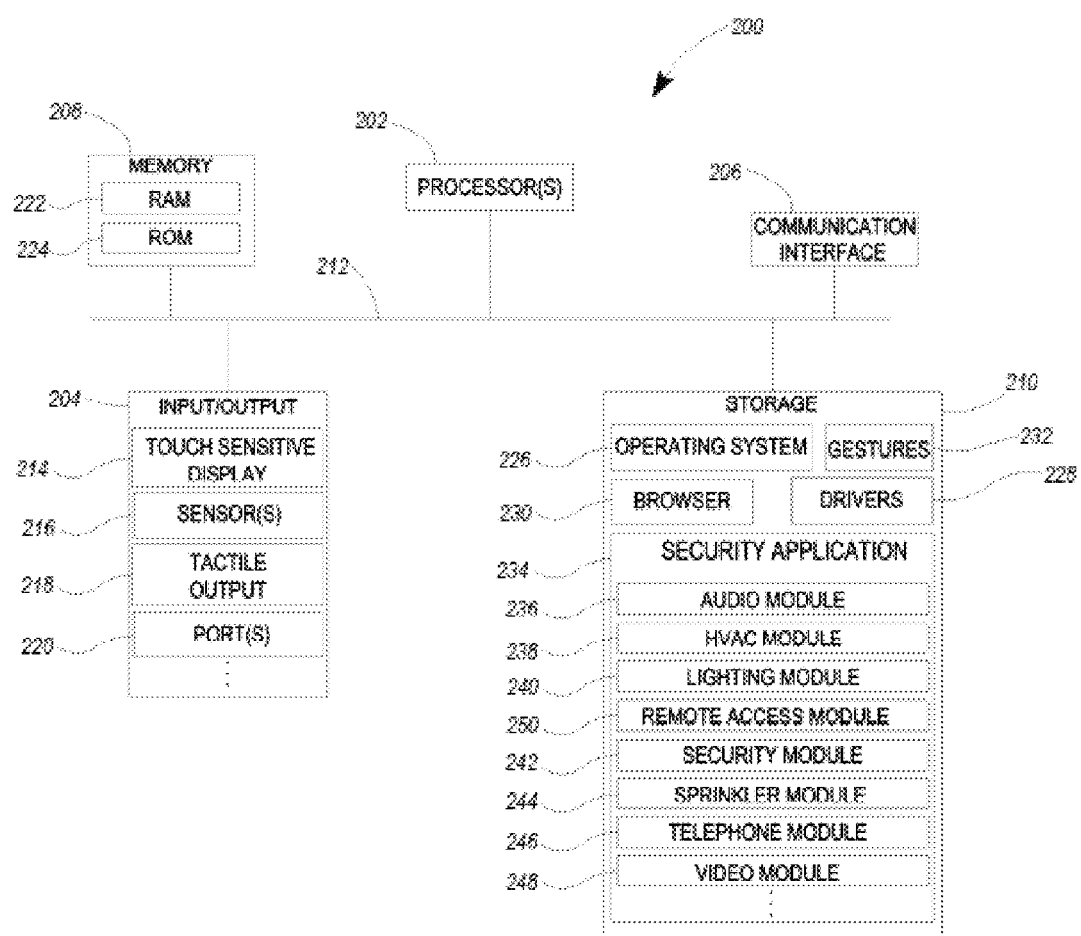
FIG. 2 is a schematic diagram of an exemplary control panel of the security system of FIG. 1.

The various components, systems and devices of the system 100 may have varying capabilities, processing power, storage abilities, and the like. FIG. 2 illustrates one example embodiment of a control panel 200 that may be used in the system 100; however, it should be appreciated that control panels may include any number of different features, components or capabilities. Thus, FIG. 2 and the description thereof should not be considered limiting of the present disclosure.

In FIG. 2, the control panel 200 may include multiple components interacting together over one or more communication channels. In one embodiment, one or more processors 202 may communicate with input/output devices 204, a communication interface 206, memory 208 and/or a mass storage device 210 via a communication bus 212. The processors 202 may generally include one or more processing components, including a central processing unit, a graphics processing unit, or the like, any of which may be capable of executing computer-executable instructions received or stored by the security control panel 200.

The processors 202 may communicate with the input/output devices 204 using the communication bus 212. The input/output devices 204 may include various components, including a touch-sensitive display 214, one or more sensors 216, tactile output components 218, one or more ports 220, or other components. Such components may include, for instance, buttons or keypads, a mouse, scanners, printers, cameras, global positioning system (GPS) units, biometric input systems (e.g., iris scanners, fingerprint readers, etc.), other components, or any combination of the foregoing. The communication interface 206 may receive or transmit communications via a network (e.g., network 102 of FIG. 1), and received communications may be provided over the communication bus 212 and processed by the one of more processors 202.

The security control panel 200 may also include memory 208 and mass storage device 210. In general, the memory 208 may include both persistent and non-persistent storage, and in the illustrated embodiment, the memory 208 is shown as including random access memory (RAM) 222 and read only memory (ROM) 224. Other types of memory or storage may also be included. The mass storage device 210 may generally be comprised of persistent storage in a number of different forms. Such forms may include a hard drive, flash-based storage, optical storage devices, magnetic storage devices, or other forms which are either permanently or removably coupled to the security control panel 200. In some embodiments, mass storage device 210 may store an operating system 226 defining the general operating functions of the security control panel 200. In some embodiments, the operating system 226 may be executed by the processors 202. Other components stored in the mass storage device 210 may include drivers 228 (e.g., to facilitate communication between the processors 202 and the input/output devices 204), a browser 230 (e.g., to access or display information obtained over a network, including mark-up pages and information), a gesture application 232 (e.g., for use with the touch-sensitive display 214), and application programs.

Application programs may generally include any program or application used in the operation of the security control panel 200. Examples of application programs may include modules specifically designed for a home security and/or automation system (e.g., security application 234), or more general use applications. Examples of more general use applications may include word processing applications, spreadsheet applications, games, calendaring applications, weather forecast applications, sports scores applications, and other applications.

As shown in FIG. 2, in at least one embodiment, the security application 234 may include applications or modules capable of being used by the security control panel 200 in connection with a security or automation system. The modules 236-248 may provide similar functions, but for different systems monitored using the security control panel 200. For instance, the security application 234 may include an audio module 236. The audio module 236 may generally control how audio components of a security and/or automation system operate. Such audio components may be part of an entertainment system (e.g., speakers for a television or stereo), a security system (e.g., an audible alarm), a telephone system (e.g., an intercom or speaker phone), or any other system. The audio module 236 may also allow audio communication (e.g., between different control panels, between the security control panel 200 and a network operations center 104, or between the control panel 200 and a telephone, etc.).

An additional application or module within the security application 234 may include an HVAC module 238. The HVAC module 238 may control, monitor or interface with an HVAC system which may include a thermostat, air conditioner, furnace, hot water heater, or other similar components. A lighting module 240 may have similar functions, but may control, monitor or interface with lighting components including switches, lighting fixtures, and the like.

In some embodiments, the security module 242 may control, monitor, or interface with security-related components such as intrusion detection components, cameras, global positioning system (GPS) components, and safety components (e.g., fire, flood, carbon monoxide or radon detectors). The sprinkler module 244 may automate a sprinkler system, monitor operation of the system (e.g., verify water flow rates at one or more locations), and the like. The telephone module 246 may interface with a telephone system. For instance, if a user is away from a residential or commercial location, the telephone module 246 may communicate with the telephone system to automatically forward calls, route them to another person, or the like. A video module 248 may be used in connection with video functions within a security and/or automation system. The video module 248 may monitor video feeds from security cameras, interface with video entertainment devices, or provide other video-related functions, or any combination of the foregoing.

As also shown in FIG. 2, the security application 234 optionally includes a remote access module 250. The remote access module 250 may allow the security control panel 200 to be accessed using remote devices (e.g., devices 108, 110 of FIG. 1), and to potentially have communications relayed through the control panel 200 either from or to the remote device. Thus, a user of a remote device could potentially set or view audio, HVAC, lighting, security, sprinkler, telephone, video or other settings remotely, and/or monitor audio and/or video feeds from the secured location. The security application 234 may also include additional or other modules or components, including authentication, settings, preferences, emergency override, updating, and other modules.

In one embodiment, the control panel 200 of FIG. 2 may provide an intuitive interface by which a user may monitor or control one or more systems within a residential or commercial location. For example, the security application 234 (and the modules 236-248) may be monitored with the touch-sensitive display 214. For instance, the touch-sensitive display 214 may include a capacitive, pressure sensitive, or other touch-screen display. Each module 236-250 of the security application 234 may provide information which may be displayed on the touch-sensitive display 214 for operation of a corresponding system or device. In some embodiments, the touch-sensitive display 214 may be operated in connection with a gesture application 232 to allow multiple touches, gestures, and other commands to be received directly at the touch-sensitive display 214.

Figure 3:
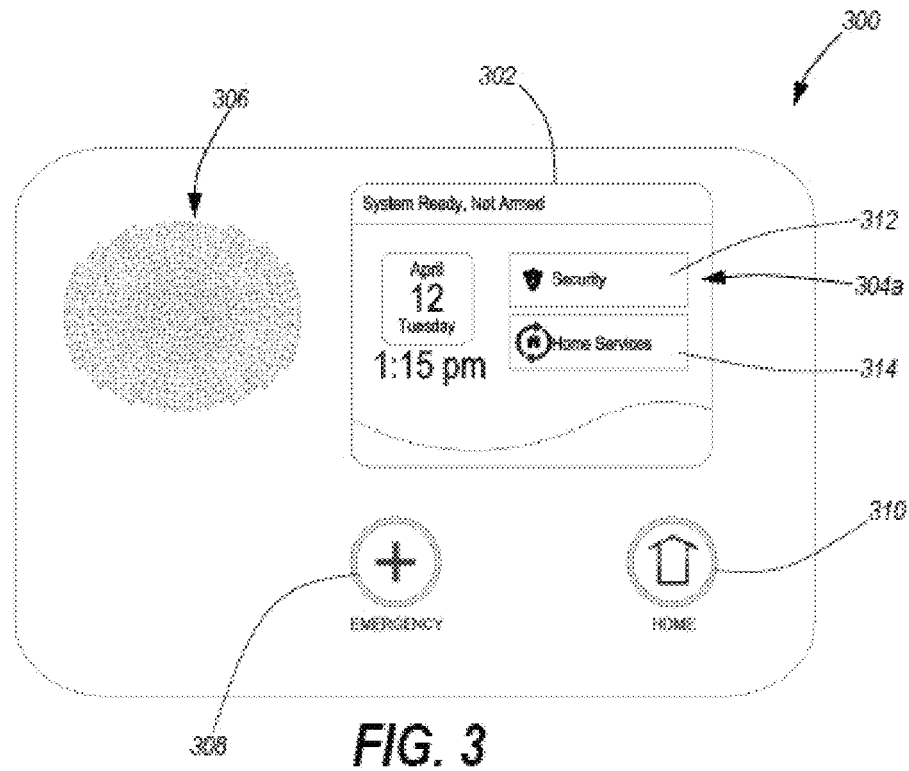
FIGS. 3 and 4 is an example control panel for use within a security system.

FIG. 3 illustrates an example of a control panel 300 incorporating a display 302 that may be operated in accordance with embodiments of the present disclosure. The display 302 may display an interface 304a. The interface 304a may include a view presented by software, firmware, or other components stored on computer readable media in the control panel 300, or otherwise accessible thereto.

The control panel 300 may further include additional components. Examples of additional components, illustrated in FIG. 3, may include an audio component 306 and input buttons 308, 310. The audio component 306 may include an optional speaker and/or microphone component. For instance, the audio component 306 may allow a sound to be presented when a certain event occurs. For example, an alarm may sound when the control panel 300 is notified of a breach at an armed door, window or other location. As another example, the control panel 300 may be used in a home entertainment context. Music or other entertainment programming may be accessed and audio data may be provided through the audio component 306.

In the same or other embodiments, the audio component 306 may act as an intercom. A person wishing to enter the residential or commercial location may speak into a microphone and that information can be transmitted to the control panel 300 and output via the audio component 306. Additional two-way communications may be provided. For instance, the button 308 may be an "emergency" button designed to be pressed when an emergency occurs. In some cases, pressing the button 308 may cause the control panel 300 to contact a remote party such as an emergency response provider (e.g., police, fire, medical, hospital, etc.) or a network operations center. Two-way communication with the remote provider may be facilitated by the audio component 306 as well as by communication systems (e.g., telephone connections, wireless communication, VOIP, etc.) within the control panel 300.

In some embodiments, an additional button 310 may also be provided as shown on the control panel 300 in FIG. 3. In this embodiment, the button 310 is a "home" button. When pressed, the button 310 may trigger a response where the display 302 illustrates a predetermined, home interface. As an example, the interface 304a may be a home interface. As a user navigates through different interfaces and views, the button 310 may therefore return the user to the interface 304a.

Figure 4:
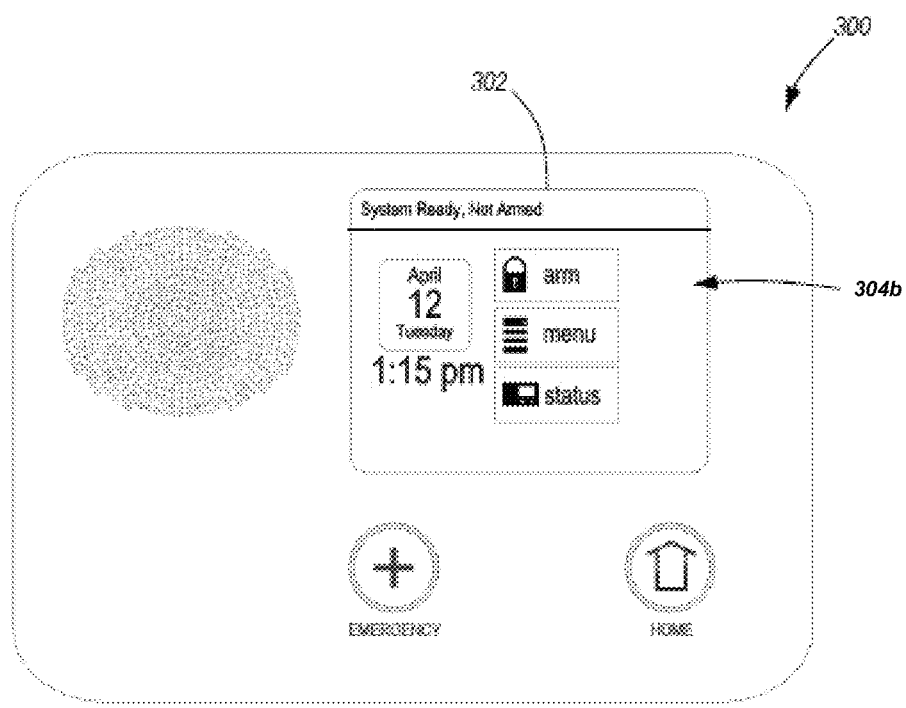

The buttons 308, 310 may therefore act as input components. In response to user input, an action may be triggered. The control panel 300 may include additional or other interfaces. For instance, additional, different or fewer buttons may be provided, or different types of inputs (e.g., switches, toggles, etc.) may be provided. Additionally, in the control panel 300 of FIG. 3, the display 302 may act as an additional input mechanism. More particularly, the display 302 may be touch-sensitive (e.g., a touchscreen). The display 302 may recognize a touch from a user, stylus, or the like. When received, the location and/or manner in which the touch is received may trigger a response. As an illustration, the interface 304a displays two selectable options, namely a security option 312 and a home services option 314. If the user taps or otherwise touches the display 302 at a location corresponding to the position of the security option 312, an additional interface may be presented to allow the user to select, view, or change security settings (e.g., to arm a security component). An example security interface is shown in FIG. 4, as interface 304b. Alternatively, by tapping or otherwise touching the display 302 at a location corresponding to the position of the home services option 314, additional options may be presented. Examples of additional home services options may include options identified in FIG. 2 and the discussion related thereto, as well as in other portions of this disclosure.

The display 302 of FIGS. 3 and 4 may be configured to recognize any number of different types of inputs. For instance, as discussed herein, a user may tap the display 302 to select a corresponding option (e.g., options 312, 314 in FIG. 3 or the "arm", "menu" or "status" options in FIG. 4). Further inputs recognized by the display 302 may include multiple, simultaneous touches of the display 302 and/or gestures. Gestures may generally include a touch of the display 302 (e.g., a touch-point), optionally accompanied by a corresponding movement of the finger, stylus or other element touching the display 302. Gestures may be combined with multiple touch-points or may be used with a single touch-point of the display 302.

Figure 5:
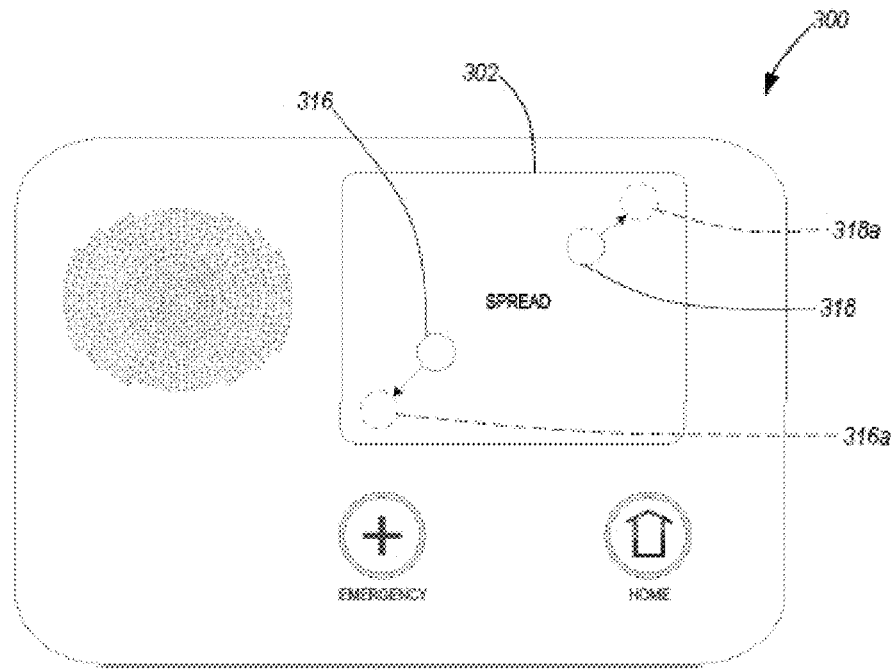
FIG. 5 is an exemplary control panel configured to receive and recognize expand gestures.
Figure 6:
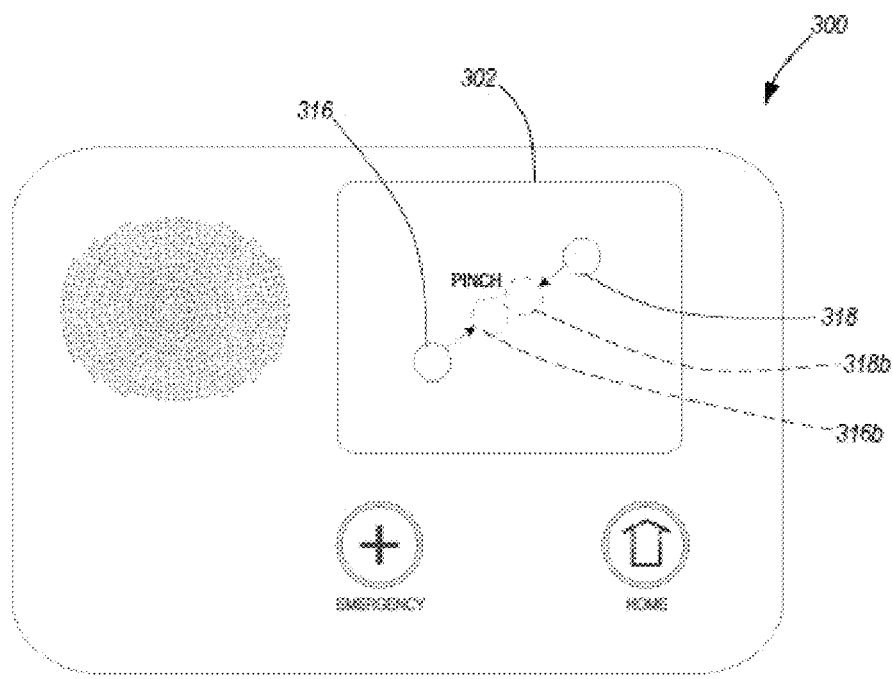
FIG. 6 illustrates an exemplary control panel configured to receive and recognize pinch gestures.

In some embodiments, as shown in FIGS. 5 and 6, multiple touch-point and gesture inputs may be recognized when the display 302 of the control panel 300 is touched. In FIG. 5, for instance, a user may use their fingers to touch the display 302 at two touch-points, 316, 318. Upon touching the display 302, the user may then move their fingers in a predetermined manner recognizable by the control panel 300 (e.g., using a gesture recognition application as part of an operating system or as a separate application as shown in FIG. 2).

In exemplary embodiments as shown in FIGS. 5 and 6, the predetermined patterns of gestures may include spreading and pinching gestures. In particular, the spreading gesture, shown in FIG. 5, may include touching the display 302 at touch-points 316, 318 and then moving the touch-points further apart. This is represented in FIG. 5 using the illustrated arrows. The touch-points 316, 318 may spread and move further apart to the positions illustrated as touch-points 316a and 318a. FIG. 6 illustrates effectively the opposite gesture. In FIG. 6, the user may touch the display 302 at touch-points 316, 318 and move the touch-points closer together. This is represented in FIG. 6 using the arrows and the moved touch-points shown at touch-points 316b and 318b.

When multiple touch-points and gestures are detected, the control panel 300 may recognize the gesture, identify an action associated with the gesture, and perform the action. Performance of the action may be dependent upon the gesture; however, the action may also be dependent on the touch-points 316, 318. For instance, if multiple objects are displayed on the display 302, the action associated with the gesture may affect all objects or some objects (e.g., a single object).

Figure 7:
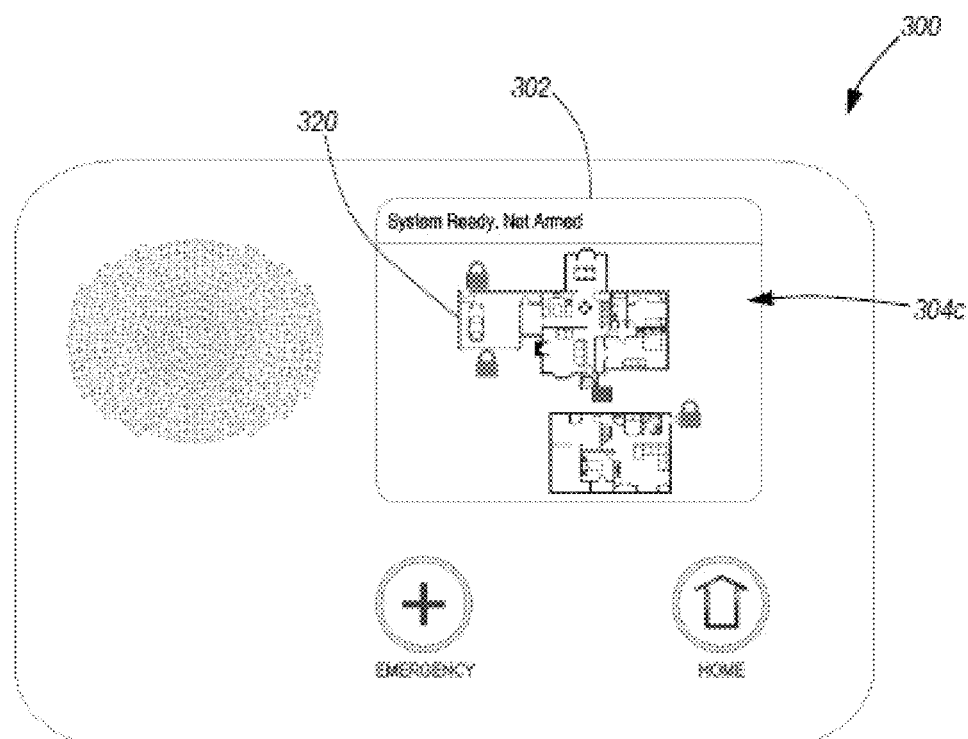
FIGS. 7 and 8 illustrate an exemplary control panel configured with zooming functions on a map.

FIGS. 7-10 illustrate exemplary actions that may be performed based on the gestures performed in FIGS. 5 and 6. For example, FIG. 7 illustrates interface 304c on the display 201 of the control panel 300. The interface 304c may display a map 320. The map 320 may be a floor plan or other similar map of a residential or commercial building, although a map may be of other locations (e.g., an entire lot, a neighborhood, a city, etc.). The map 320 may serve any of a number of purposes. In some embodiments, for instance in FIG. 7, the map 320 may show which building entrances (e.g., windows or doors) associated with a security device may be armed, disarmed, or otherwise configured. In other embodiments, the map 320 may have other purposes, such as locating a particular person, pet, set of keys, etc. (e.g., using GPS tracking or other mechanisms).

Figure 8:
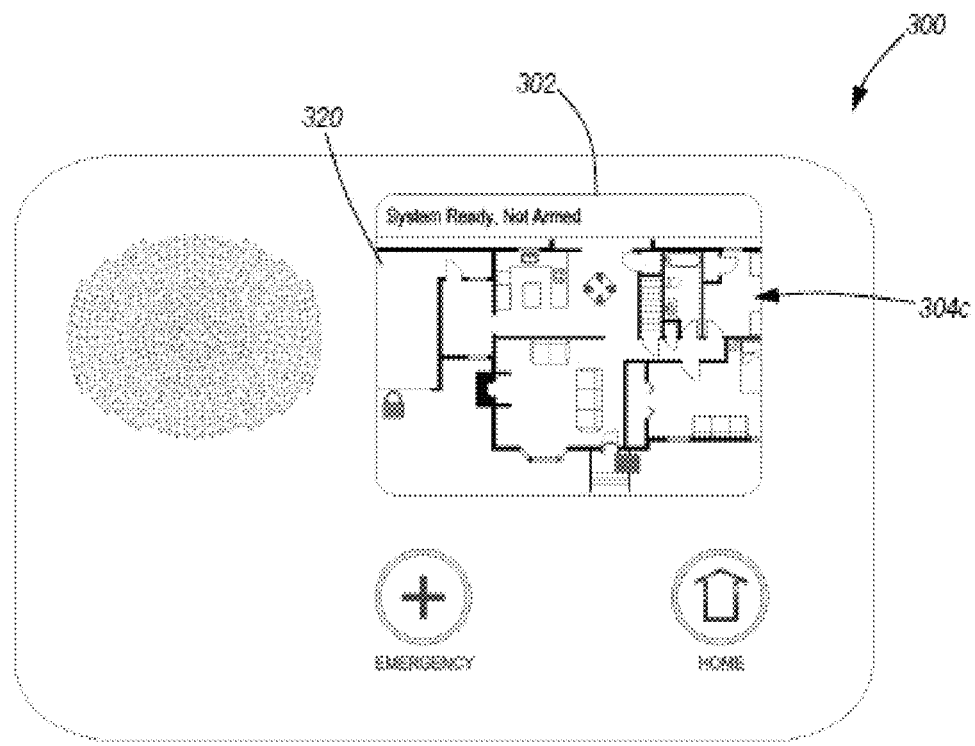

In some embodiments, as shown in FIG. 7, the control panel 300 and interface 304c may display an initial presentation of the map 320. If, however, the user touches the display 302 and performs a gesture (e.g., the gesture in FIG. 5), the map 320 may change within the interface 304c. As an example, by touching two or more places on the display 302 and then spreading the touch-points, a user may zoom-in on the map 320. FIG. 8 illustrates an example in which the control panel 300 causes the interface 304c to zoom-in on the map 320.

Alternatively, the user may zoom-out from the map 320 in the interface 304c to a desired magnification level. In some embodiments, such an action may be performed by using an opposite gesture (e.g., the pinch gesture of FIG. 6). In either case, the gesture performed may be repeated multiple times. Repeating a spread gesture may, for instance, allow the magnification level to be repeatedly increased on an object or set of objects within the interface 304c. Similarly, repeating a pinch gesture may repeatedly decrease the magnification level. An example of zooming-out on an object is shown in going from the view of map 320 in FIG. 8 to the view in FIG. 7.

Figure 9:
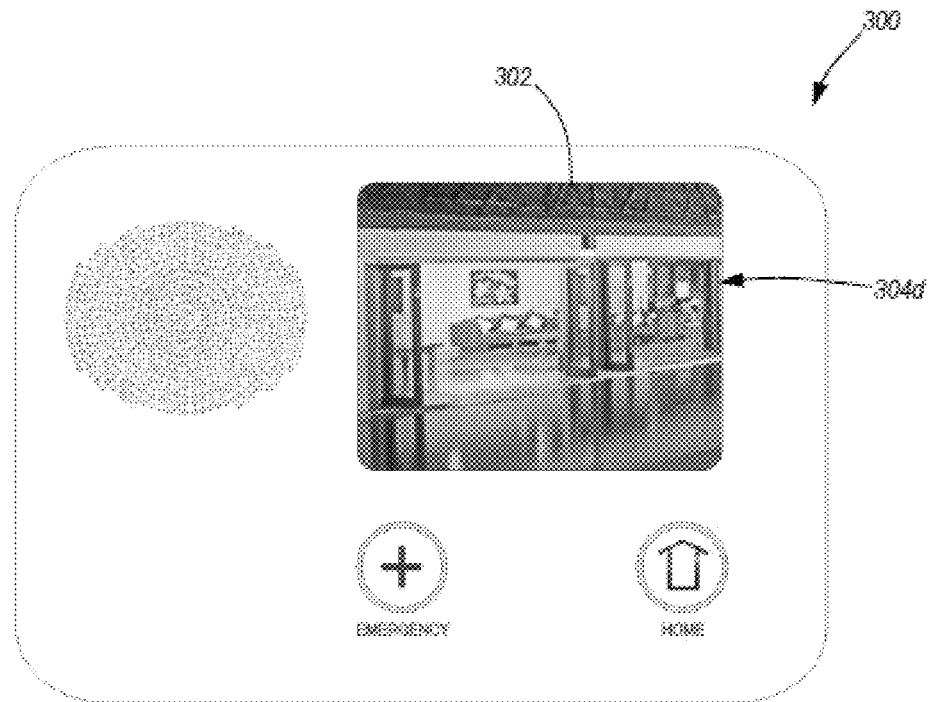
FIGS. 9 and 10 illustrate an exemplary control panel allowing zooming functions on an image.
Figure 10:
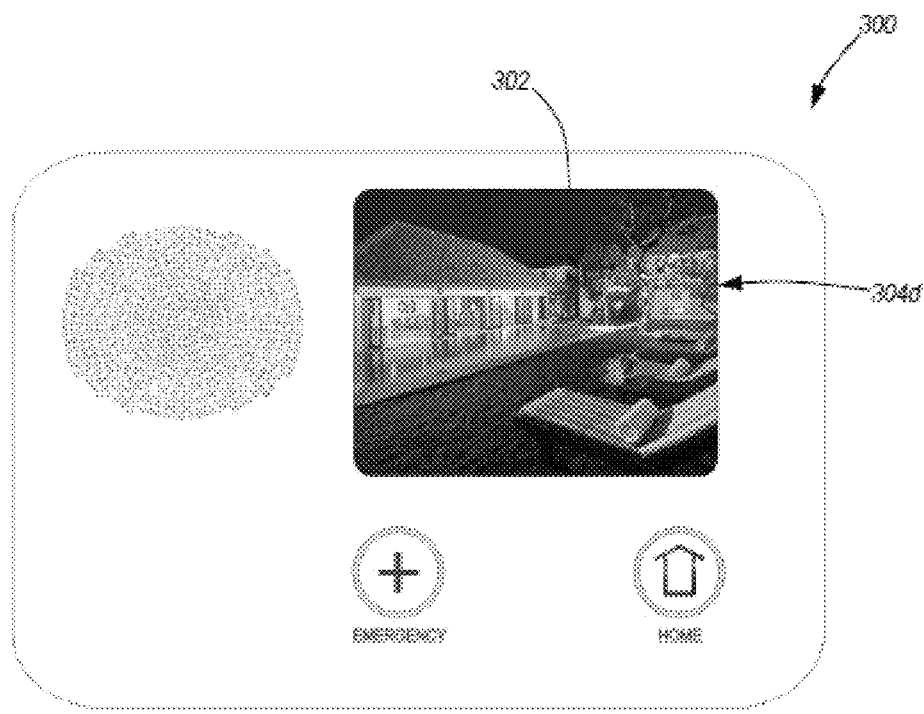

In further embodiments, a gesture may be zoom in or zoom out on an object. More particularly, in some embodiments as shown in FIGS. 9 and 10, interface 304d may be displayed on the display 302 of the control panel 300. The interface 304d may be a view from a camera (e.g., a security camera). The camera may provide a view illustrating a particular object, room, or other location. In this embodiment, FIG. 9 illustrates a view of a particular room.

If the user wants a closer view of the particular object or location, the user may touch the display 302 and perform a gesture corresponding to a zoom-in action (e.g., the spreading gesture of FIG. 5, double-tapping the display, etc.). Similarly, by performing a gesture corresponding to a zoom-out action (e.g., the pinching gesture of FIG. 6), the control panel 300 may zoom out and provide a broader view of a location. FIG. 10 illustrates an example where the camera feed is zoomed out, which exposes the room shown in FIG. 9, as well as an outdoor area. Of course, the displayed location is merely illustrative, and a camera feed may be located at any location inside or outside a residential, commercial building, or other premises to provide a number of different views.

Providing for the ability to zoom in and zoom out on the display 302 may allow a user to zoom in or zoom out to see a number of different objects, whether the interface displays a camera feed, map, or some other object. For instance, a user searching for his keys may zoom in on various locations within a building to find and see the keys from the display 302. Similarly, a user may search for a person carrying a GPS-equipped phone or a pet carrying a GPS transponder. The user could zoom out in a map or camera-feed to find the general location of the person or pet, and then zoom in on the location to find more precise coordinates.

In some embodiments, performing a gesture may change the magnification level as shown in FIGS. 7-10. Such magnification may be performed directly at the control panel 300 by, for instance, increasing the magnification of an object or set of objects within the display 302. In other embodiments, however, the gestures performed may cause the control panel 300 to perform another action. In the example of a camera feed, for instance, when a gesture corresponding to a zoom function is received, the control panel 300 may communicate with the security camera to cause the camera itself to zoom in or out. Similar capabilities may be provided to allow a user to move the focal point of the camera around (e.g., using a drag gesture as described hereafter with respect to FIGS. 14-16). Additional gestures may even provide the ability to change between map views or camera feeds (e.g., using a flick gesture as described with respect to FIGS. 14, 17 and 18). The pinch and spread gestures may be associated with other functions as well.

Figure 11:
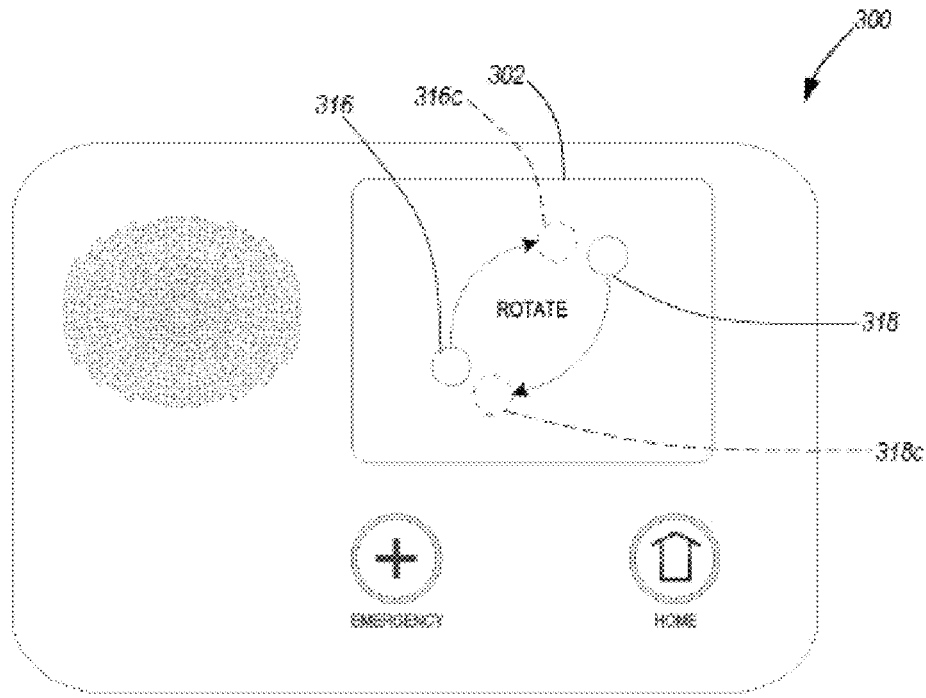
FIG. 11 illustrates an exemplary control panel configured to receive and recognize rotate gestures.

In some embodiments, other gestures may manipulate the interface of the display of the control panel 300. FIG. 11, for instance, illustrates another example embodiment in which a user may touch the display 302 of the control panel 300 at touch-points 316, 318 and move the touch-points in a predetermined manner. In particular, FIG. 11 illustrates a rotational movement in which the touch-points 316 and 318 move to corresponding positions at touch-points 316c and 318c by following rotational or curved paths. The particular paths are illustrated as being in a clockwise direction, but they could also be in other directions, including counter-clockwise.

Figure 12:
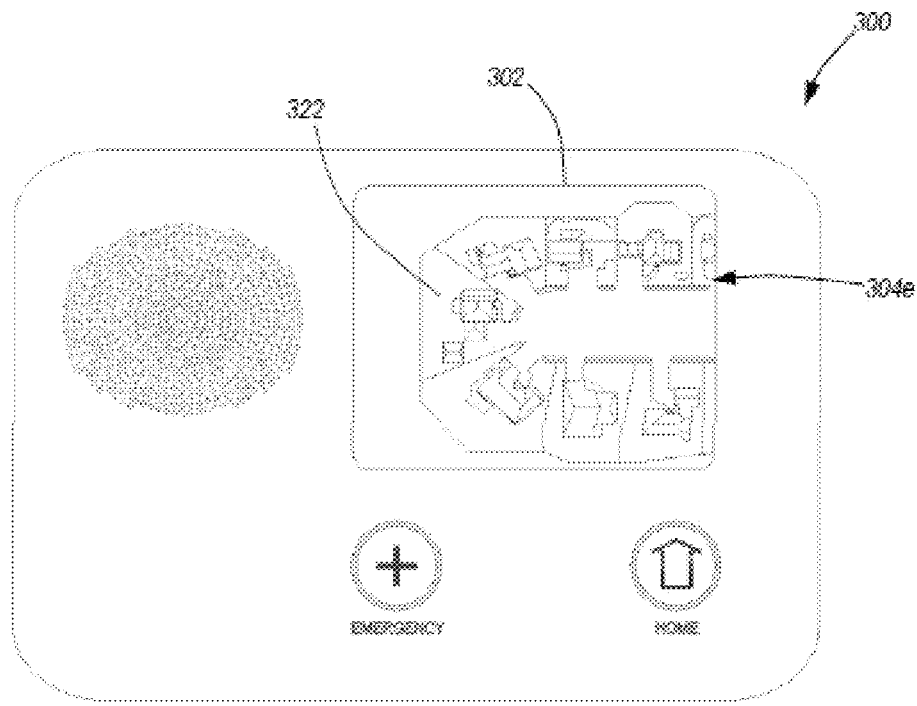
FIGS. 12 and 13 illustrate an exemplary control panel allowing rotate functions.
Figure 13:
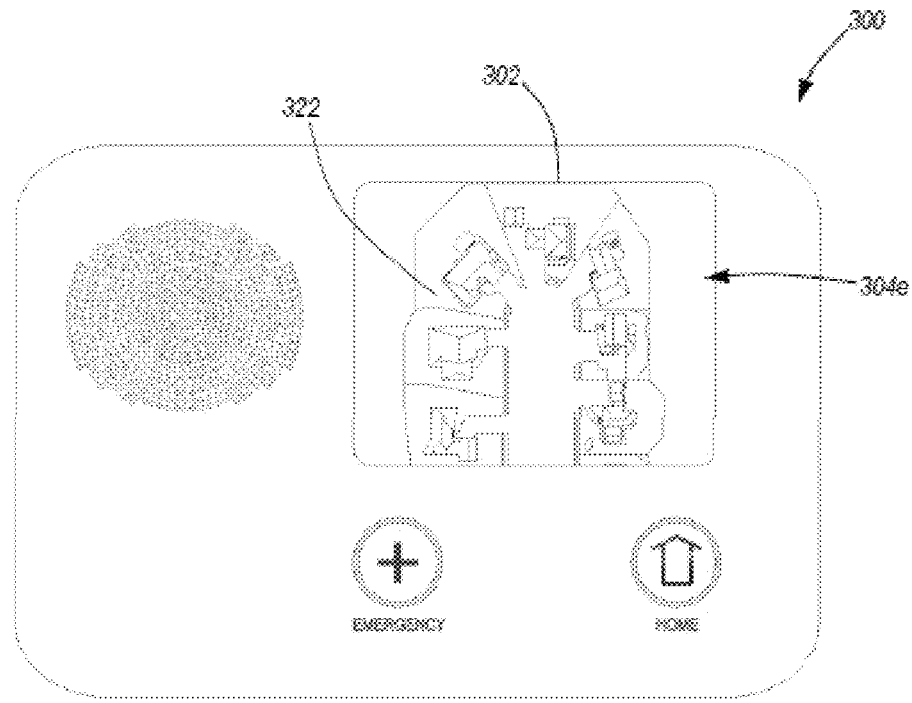

The rotational gesture illustrated in FIG. 11 may be associated with one or more actions that may change the size, shape, type, number or other characteristics of the objects displayed in the display 302. For instance, FIG. 12 illustrates the display 302 as including an interface 304e having thereon a map 322. In some instances, the map 322 may be a neighborhood map. If the user touches the display 302 and performs a particular gesture (e.g., the rotational gesture of FIG. 11), the map 322 may change. FIGS. 12 and 13 illustrate an example in which the map 322 rotates clockwise from a horizontal position (FIG. 12) to a vertical position (FIG. 13) as a result of a rotational gesture.

In accordance with some embodiments, a rotational gesture may cause an interface of the display 302 to change and rotate one or more objects in a predetermined direction. The direction may always be the same, or may be based on the gesture. For instance, rather than rotating one or more touch-points clockwise, the user may rotate touch points in a counter-clockwise direction. As a result, the map 322 could rotate in a counter-clockwise direction.

In view of the disclosure herein, one skilled in the art should also appreciate that the gesture of FIG. 11 could perform other actions, or could be replaced with other gestures to rotate an object. As an example, a user could touch the display 302 at a single point and move the touch-point along a curved path. The curved path could indicate a desire to rotate an object. In other embodiments, more than two touch-points may be used. In still further embodiments, two touch-points may be used; however, only touch-point may be moved in a rotational direction (e.g., the second touch-point is held in place).

Figure 14:
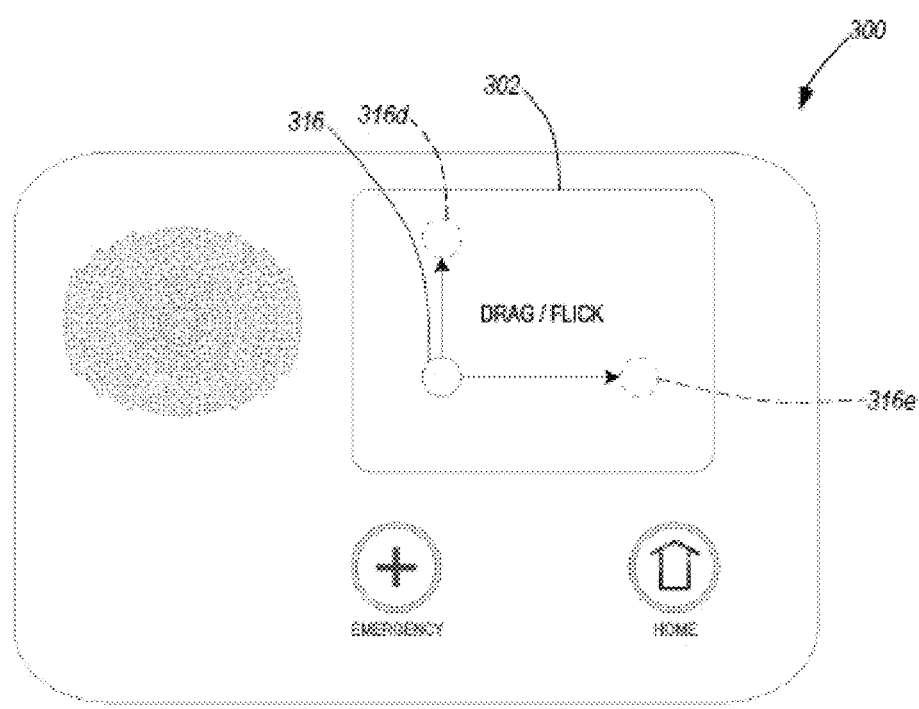
FIG. 14 illustrates an exemplary control panel configured to receive and recognize drag and/or flick gestures.

FIG. 14 illustrates still another set of example gestures that may be performed on, and recognized by, the display 302 of the control panel 300. The gestures may include a single touch-point 316 moved in a particular direction (e.g., to touch-point 316d or 316e). Depending on the speed with which the touch-point 316 is moved, the gesture may be considered a dragging motion or a flicking motion. More particularly, if the control panel 300 recognizes the motion occurs over a very short time (e.g., less than half a second, less than a quarter second, less than a tenth of a second, etc.) the control panel 300 may determine the gesture is a flick gesture, whereas movements over longer periods of time may be considered dragging gestures. Dragging and flicking gestures may have different associated actions in the display 302.

Figure 15:
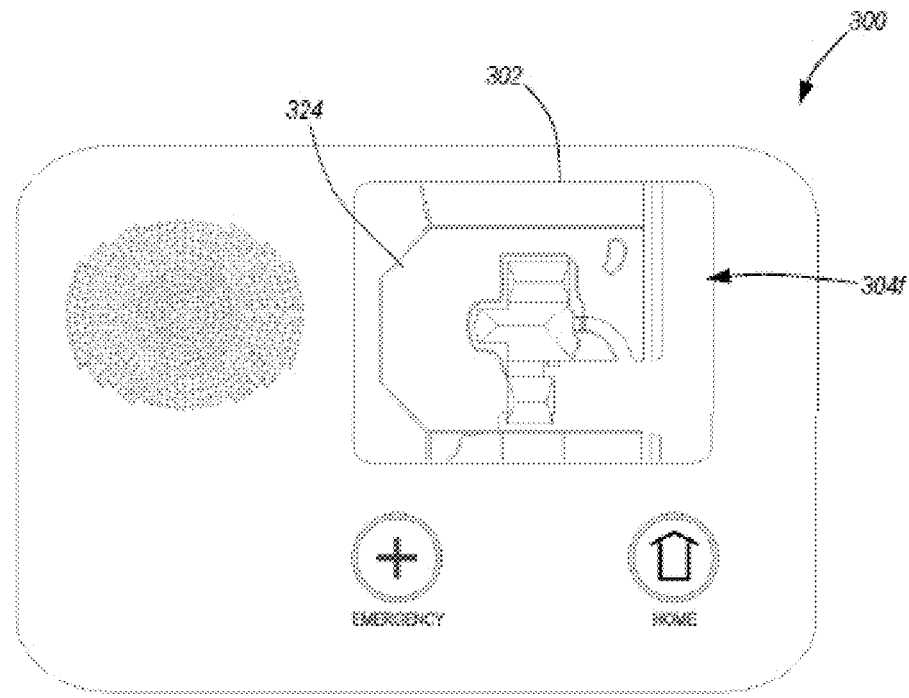
FIGS. 15 and 16 illustrate an exemplary control panel allowing pan functions.
Figure 16:
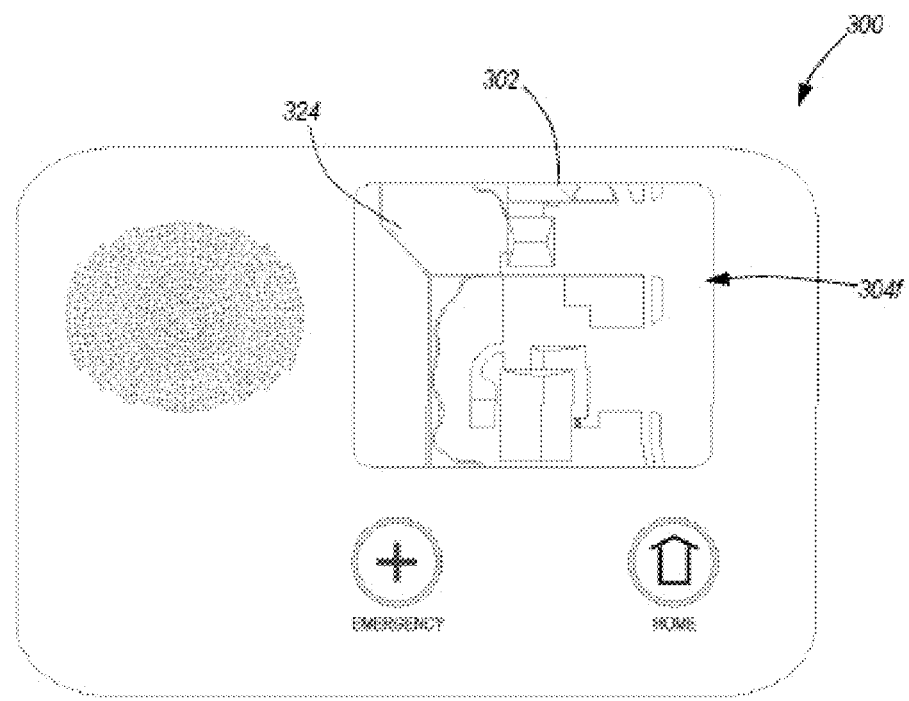

For instance, FIGS. 15 and 16 illustrate an exemplary action of the control panel 300 in response to a drag or flick gesture. The display 302 may show an interface 304f which may be a map 324. The map 324 may be a map of a room, house, street, neighborhood, city, or other location. In some embodiments, the interface 304f may display one or more other objects. For example, the interface 304 may display any object in a security system or home automation system, including views from one or more cameras.

In some embodiments, a panning action may be associated with a drag gesture. Therefore, if the user performs an action similar to the gesture from touch-point 316 to touch-point 316 in FIG. 14, and does so at a rate recognized as a drag gesture, the map 324 may pan within the interface 304 in a corresponding direction. In this particular embodiment, an upward drag gesture may cause the map 324 to pan upward and show additional portions of the map 324, as shown by the change in the view of the display 302 from FIG. 15 to FIG. 16. An opposite, or downward, drag gesture may cause the control panel 300 to pan the map 324 downward in an opposite direction (e.g., from the view in FIG. 16 to the view in FIG. 15). Drag gestures may be in any direction such as, for example, diagonal, horizontal, linear, non-linear, curved, other any other associated direction. Furthermore, in some embodiments, a drag gesture may include changes in direction such that the objects in the display 302 pan or scroll about in real-time with the gesture.

A drag gesture as shown in FIGS. 15 and 16 may generally be used to pan or scroll and change the position of one or more objects within the interface 304e of the display 302. In other embodiments, actions performed in response to gestures may change the interface 304e itself, rather than the position or other characteristics of objects or images therein.

Figure 17:
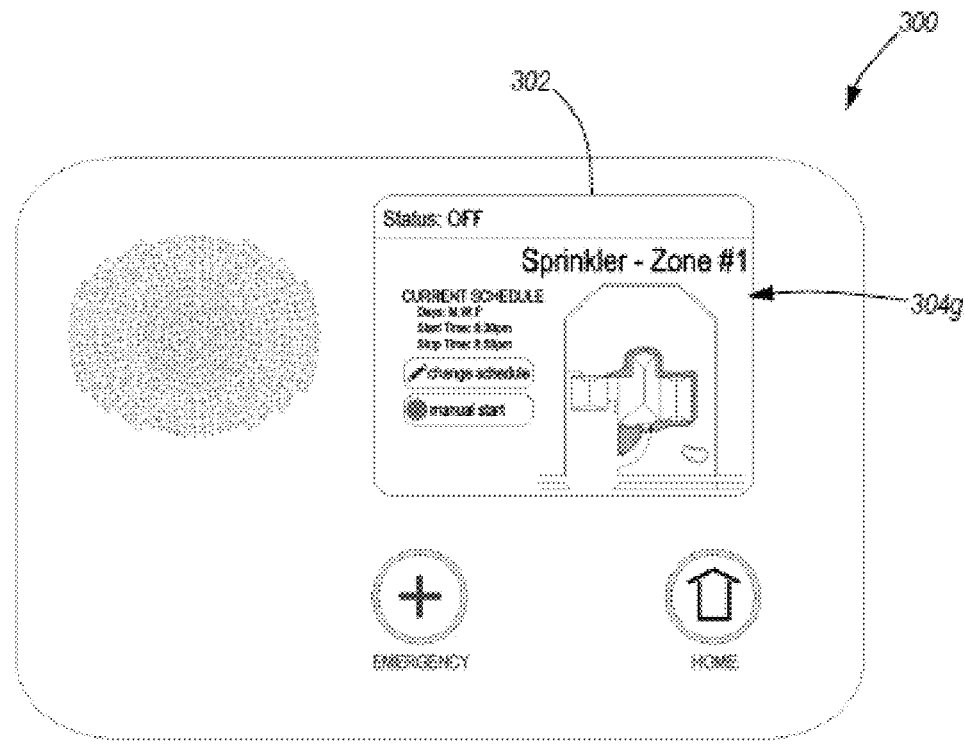
FIGS. 17 and 18 illustrate an exemplary control panel allowing flick functions.
Figure 18:
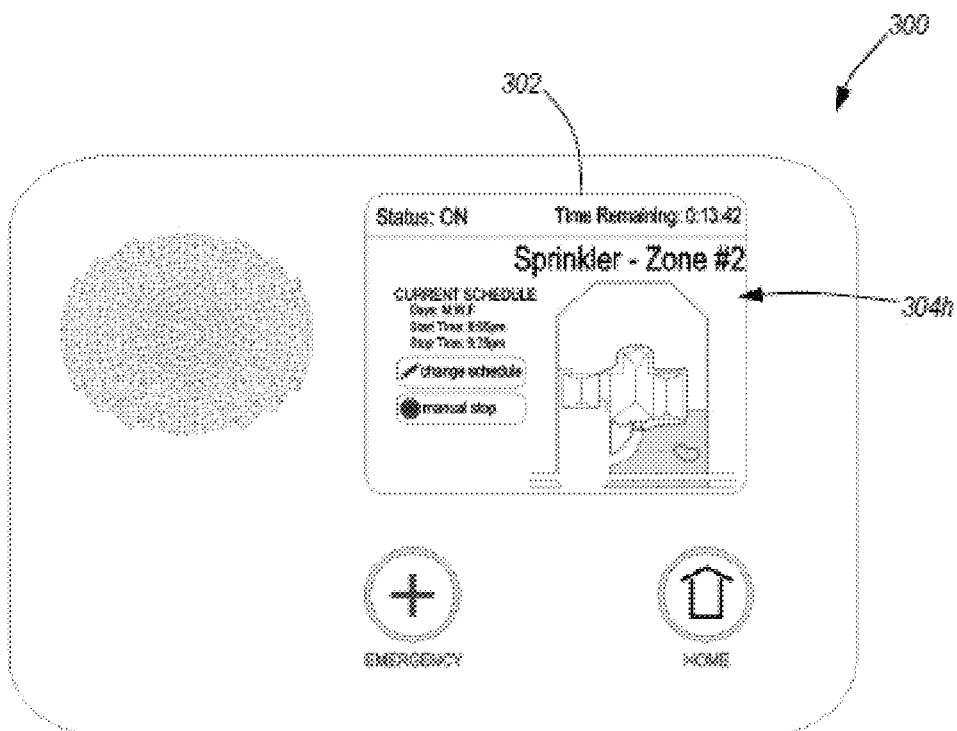

FIGS. 17 and 18, for instance, illustrate a control panel 300 having a display 302 where the interface may change from a first interface 304g (FIG. 17) to a second interface 304h (FIG. 18). In some embodiments, a flick gesture, such as that described with respect to FIG. 14, may change the displayed interface. For example, in FIG. 17, the first interface 304g may generally provide information about a sprinkler system managed or monitored using the control panel 300. In this embodiment, the first interface 304g may provide information about a particular zone of a sprinkler system (e.g., flower beds). Information such as the current status of the zone, a schedule for the zone if the sprinkler system is automated, an option to change the schedule, an option to start the zone, a map of sprinklers or the coverage area of the zone, information on whether any problems are detected in the zone, and the like may also be displayed.

A sprinkler system may include multiple zones. A second zone may, therefore, also have corresponding information displayed in an associated interface. FIG. 18 illustrates a second interface 304h for displaying information on the second zone (e.g., for a front yard). In this embodiment, the second zone is shown to be currently turned on, and other information displayed includes the automated schedule, the time remaining in a current program, an option to change the schedule, a map of the zone, and an option to stop the sprinklers of the second zone.

One embodiment of the present disclosure contemplates changing between the first interface 304g and second interface 304h using a gesture, for instance, a flick gesture. FIG. 14 provides an example in which a user may rapidly move a contact point on the display 302 from a first touch-point 316 to a second touch-point 316e. If the control panel 300 of FIG. 17 recognizes the gesture as a flick, the control panel 300 may determine the user wishes to change interfaces rather than scroll objects in the same interface. Thus, the control panel 300 may change from first interface 304g to second interface 304h. If the user wants to scroll to an interface corresponding to yet another zone, the user could repeat the flick gesture. A flick gesture in an opposite direction may cause the control panel 300 to move back to a previous interface.

A flick gesture may be generally horizontal, but may also be in other directions. Different directions of flick gestures may have different corresponding actions. For instance, a vertical (up or down) flick gesture may cause the display 302 to change from one type of interface (e.g., sprinkler system) to another type (e.g., system menu, entertainment, lighting, HVAC, cameras, alarms, etc.).

The tap, press, flick, drag, rotate, pinch and spread gestures described herein, as well as the particular actions associated therewith, are intended to merely illustrate examples of some types of gestures that may be recognized by a control panel of a security system. Additional or other gestures or inputs may also be provided. For instance, combinations of the above may be included. As an example, a gesture may be associated with a combined tap and drag motion. Additional gestures may include double tap gestures or tap and hold gestures. In addition, while the illustrated gestures include one or two touch-points, even more touch-points may be monitored. By way of illustration, the display 302 of the control panel 300 may recognize three or more simultaneous touch-points.

The types of actions associated with a gesture may also be varied, and need not include or be limited to select, zoom, rotate, pan, scroll and interface change actions. Other actions associated with gestures may include deleting, copying, moving, bundling, closing, opening, drawing, and other actions.

Some or all embodiments of the present disclosure may also include other features to facilitate use or desirability of the control panel in a security system. One aspect of buttons, toggles, switches, and mechanical controls is that as the control is activated, there is generally an associated movement of a portion of the control (e.g., a depressed button physically moves downward). This movement can be sensed by a user and the user obtains a real-time, tactile response than an action has been carried out. In contrast, touch-screens and non-mechanical buttons (e.g., pressure sensitive or capacitive contact surfaces) which do not rely on movement of mechanical components generally do not provide such a response. Instead, the user must wait for a visual or audio confirmation that an action has been received.

Figure 19:
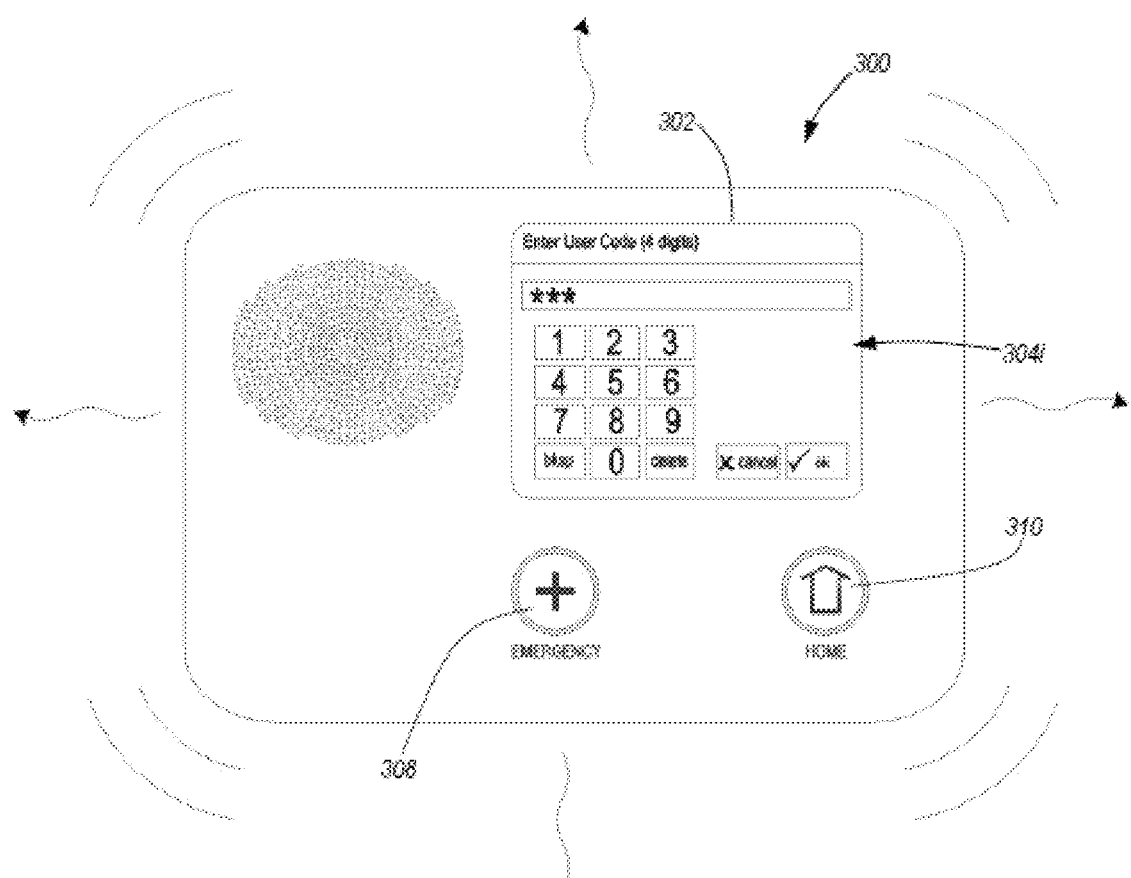
FIG. 19 illustrates an exemplary control panel providing a haptic response.

In some embodiments, as shown in FIG. 19, the illustrates an example control panel 300 may provide a user with a haptic response and tactile feedback even when non-mechanical input components are used. In some embodiment, the display 302 of the control panel 300 may show an interface 304i. According to some embodiments, the user may touch the display 302 to provide an input (e.g., to enter a PIN or other credentials to arm or disarm an entrance, to select an available menu option, etc.). The control panel 300 may include a tactile output component (see FIG. 2) configured to respond when input is received at the display 302. For instance, a sensor may detect contact on the display 302 and communicate with the tactile output component. When the tactile output component receives an indication of contact, the tactile output component may vibrate, rotate, move, or otherwise provide a mechanical stimulus. For instance, a vibration may be generated causing the entire control panel 300 to vibrate as reflected by the arrows and motion lines in FIG. 19.

Vibration of the control panel 300 in response to input at the display 302 is merely one example of haptic feedback. In other embodiments, for instance, the display 302 may move or rotate. An example may include making the entire display 302 movable relative to the control panel 300 so that when the display 302 is touched, the display 302 moves. In still other embodiments, haptic feedback may be provided in response to input at the optional buttons 308, 310. For example, input at the buttons 308, 310, which are separate relative to the display 302, may result in haptic feedback. The haptic feedback may be the same as for the control panel 300, or different therefrom. In some embodiments, haptic feedback may be provided for one of the, but not both, buttons 308, 310 (or one button).

Embodiments of the present disclosure may comprise or utilize a special purpose or general-purpose computer including computer hardware, such as, for example, one or more processors and system memory. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the disclosure may comprise at least two distinctly different kinds of computer-readable media, including at least computer storage media and/or transmission media.

Examples of computer storage media include RAM, ROM, EEPROM, CD-ROM or other optical disk storage, magnetic disk storage or other magnetic storage devices, flash-based storage, solid-state storage, or any other non-transmission medium which can be used to store desired program code means in the form of computer-executable instructions or data structures and which can be accessed by a general purpose or special purpose computer.

When information is transferred or provided over a communication network or another communications connection (either hardwired, wireless, or a combination of hardwired or wireless) to a computing device, the computing device properly views the connection as a transmission medium. A "communication network" may generally be defined as one or more data links that enable the transport of electronic data between computer systems and/or modules, engines, and/or other electronic devices, and transmissions media can include a communication network and/or data links, carrier waves, wireless signals, and the like, which can be used to carry desired program or template code means or instructions in the form of computer-executable instructions or data structures within, to or from a communication network. Combinations of storage media and transmission media should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise instructions and data which, when executed at a processor, cause a general purpose computer, special purpose computer (e.g., a security system control panel), or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable logic machines, multi-processor systems, microprocessor-based or programmable consumer electronics, network PCs, tablet computing devices, minicomputers, security system control panels, security system network operations centers, mainframe computers, mobile telephones, PDAs, pagers, routers, switches, and the like.

Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Those skilled in the art will also appreciate that embodiments of the present disclosure may be practiced in special-purpose, dedicated or other computing devices integrated within or particular to a particular residence, business, company, government agency, or other entity, and that such devices may operate using a network connection, wireless connection, or hardwire connection. Examples may include residential or commercial buildings in connection with security systems configured to monitor local conditions (i.e., at the same building or location), remote conditions (i.e., at a different building or location), or some combination thereof.

Although the foregoing description contains many specifics, these should not be construed as limiting the scope of the disclosure or of any of the appended claims, but merely as providing information pertinent to some specific embodiments that may fall within the scopes of the disclosure and the appended claims. Various embodiments are described, some of which incorporate differing features. The features illustrated or described relative to one embodiment are interchangeable and/or may be employed in combination with features of any other embodiment herein. In addition, other embodiments of the disclosure may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed is:

1. A control panel for a security system, comprising:
   one or more processors of a security system control panel dedicated for use at a particular location within a residence;
      a communication link configured to communicatively couple the one or more processors of the security system control panel to at least one sensor within an automation system;
      a display configured on the security system control panel to detect input, wherein the input is at least one touch-point on the display and a first gesture associated with the at least one touch-point;
      displaying a first interface of a first security zone on the display based at least in part on the first gesture;
      displaying a second interface of a second security zone based at least in part on two characteristics associated with a second gesture performed on the first security zone of the first interface and providing an option to change a characteristic of the second security zone, wherein the option is based at least in part on the two characteristics, wherein the second security zone is different from the first security zone displayed on the first interface; and
      a tactile output component configured to provide a haptic response to the input received at the security system control panel.

2. The control panel of claim 1, further including:
   computer storage media having stored thereon computer-executable instructions that, when executed by the one or more processors, causes the control panel to perform predetermined actions based on a nature of the at least one touch-point and the associated first gesture on the display.

3. The control panel of claim 2, wherein the computer-executable instructions are executed by the one or more processors to cause the control panel to differentiate between different types of contact.

4. The control panel of claim 3, wherein differentiating between different types of contact includes one or more of:
   identifying a location of each of multiple touch-points on the display;
   identifying a gesture associated with each of the multiple touch-points; and
   identifying a number of simultaneous touch-points.

5. The control panel of claim 1, wherein detecting an input includes identifying one or more of: a tap; a double tap; a drag; a flick; a rotate; a spread; or a pinch.

6. The control panel of claim 2, wherein the predetermined actions include any combination of select, open, close, pan, scroll, zoom or rotate actions.

7. The control panel of claim 1, further comprising:
a home input component configured to return a user to a main interface of the display; and
an emergency input component configured to contact a remote party.

8. The control panel of claim 7, wherein the tactile output component is configured to provide a haptic response to input received by one of the home input component or the emergency input component.

9. The control panel of claim 1, wherein the at least one sensor includes an intrusion sensor of a security-related system within the automation system.

10. The control panel of claim 1, wherein the at least one sensor includes a fire, flood or carbon monoxide sensor.

11. The control panel of claim 1, wherein the at least one sensor includes a camera.

12. The control panel of claim 11, wherein the display is configured to display one or more images captured by the camera.

13. The control panel of claim 2, wherein the predetermined actions include actions on a map or camera image displayed on the display.

14. An automation system including at least a security system, comprising:
at least one security component configured on a security system control panel dedicated for use at a particular location within a residence or a commercial location to detect a potential security threat at the residential or the commercial location; and
a security system control panel, comprising:
a communication link configured to allow the security system control panel to monitor a status of the at least one security component;
a display configured on the security system control panel to display at least some information related to the status of the at least one security component and receive input through a first gesture associated with at least one touch-point on the display;
the display configured on the security system control panel to display a first interface of a first security zone on the display based at least in part on the first gesture;
a processor, in communication with the display, to determine a characteristic of the gesture;
the display configured on the security system control panel to display a second interface of a second security zone based at least in part on two characteristics associated with a second gesture performed on the first security zone of the first interface and provide an option to change a characteristic of the second security zone based at least in part on the two characteristics, wherein the second security zone is different from the first security zone displayed on the first interface; and
a tactile output component configured to provide a haptic response to input received at the touch-sensitive display.

15. The automation system of claim 14, wherein the display is configured to detect multiple, simultaneous touch-points and gestures associated with multiple, simultaneous touch-points.

16. The automation system of claim 14, further including:
an audio component including a speaker component and a microphone component configured to operate as an intercom.

17. A method for providing security using an automation system associated with a physical location, comprising:
displaying, at a security system control panel, a first interface including a map associated with a residence;
monitoring a security system that includes at least one sensor;
displaying, on the security system control panel, information corresponding to operation or status of the at least one sensor;
receiving, at the security system control panel, an input including a first gesture associated with at least one touch-point on a display of the security system control panel;
displaying, on the security system control panel, a second interface associated with a first security zone based at least in part on the first gesture, wherein the second interface is superimposed over the first interface, such that the first interface remains at least partially visible;
determining a characteristic of the first gesture;
displaying, at the security system control panel, a third interface associated with a second security zone based at least in part on a second gesture, wherein the third interface is superimposed over the first interface, wherein displaying the third interface includes removing the superimposed second interface from the first interface based at least in part on the second gesture;
providing, at the security system control panel, an option to change a characteristic of the second security zone based at least in part on the second gesture; and
providing, at the security system control panel, a haptic response to input received at the touch-sensitive display.

18. The method of claim 17, further comprising:
receiving an image at the control panel;
displaying the image on the display; and
manipulating the image based on detecting multiple, simultaneous touch points.

19. The method of claim 18, wherein the haptic response vibrates the control panel.

20. The method of claim 17, further comprising:
using a communication network to communicate with a network operations center, the communications including information related to the security system monitored by the control panel.

21. The method of claim 17, wherein the characteristic of the first gesture comprises:
a direction, or a length of time, or a combination thereof.

* * * * *